(12) United States Patent
Atria et al.

(10) Patent No.: US 11,610,346 B2
(45) Date of Patent: Mar. 21, 2023

(54) IMAGE RECONSTRUCTION USING MACHINE LEARNING REGULARIZERS

(71) Applicant: nView medical Inc., Salt Lake City, UT (US)

(72) Inventors: Cristian Atria, Salt Lake City, UT (US); Nisha Ramesh, Salt Lake City, UT (US); Dimitri Yatsenko, Salt Lake City, UT (US)

(73) Assignee: nView medical Inc., Salt Lake City, UT (US)

( * ) Notice: Subject to any disclaimer, the term of this patent is extended or adjusted under 35 U.S.C. 154(b) by 10 days.

(21) Appl. No.: 16/649,918

(22) PCT Filed: Sep. 24, 2018

(86) PCT No.: PCT/US2018/052472
§ 371 (c)(1),
(2) Date: Mar. 23, 2020

(87) PCT Pub. No.: WO2019/060843
PCT Pub. Date: Mar. 28, 2019

(65) Prior Publication Data
US 2020/0279411 A1 Sep. 3, 2020

Related U.S. Application Data

(60) Provisional application No. 62/624,663, filed on Jan. 31, 2018, provisional application No. 62/562,165, filed on Sep. 22, 2017.

(51) Int. Cl.
*G06T 11/00* (2006.01)
*G06N 20/00* (2019.01)
(Continued)

(52) U.S. Cl.
CPC .............. *G06T 11/006* (2013.01); *G06N 3/08* (2013.01); *G06N 20/00* (2019.01); *G06T 7/0012* (2013.01);
(Continued)

(58) Field of Classification Search
None
See application file for complete search history.

(56) References Cited

U.S. PATENT DOCUMENTS 5,442,674 A   8/1995  Picard et al.
5,734,483 A   3/1998  Itoh
(Continued)

FOREIGN PATENT DOCUMENTS

CN   1766930 A    5/2006
CN   104574292 A  4/2015
(Continued)

OTHER PUBLICATIONS

Schlemper et al ("A Deep Cascade of Convolutional Neural Networks for MR Image Reconstruction" In: Cornell University Library; Published Mar. 1, 2017; 12 pages; retrieved from <URL: https://arxiv.org/abs/1703.00555> on Sep. 27, 2021) (Year: 2017).*
(Continued)

*Primary Examiner* — Leon Viet Q Nguyen
(74) *Attorney, Agent, or Firm* — Thorpe North & Western, LLP

(57) ABSTRACT

A system and method for reconstructing an image of a target object using an iterative reconstruction technique can include a machine learning model as a regularization filter (100). An image data set for a target object generated using an imaging modality can be received, and an image of the target object can be reconstructed using an iterative reconstruction technique that includes a machine learning model as a regularization filter (100) used in part to reconstruct the (Continued)

image of the target object. The machine learning model can be trained prior to receiving the image data using learning datasets that have image data associated with the target object, where the learning datasets providing objective data for training the machine learning model, and the machine learning model can be included in the iterative reconstruction technique to introduce the object features into the image of the target object being reconstructed.

26 Claims, 10 Drawing Sheets

(51) Int. Cl.
G06N 3/08 (2023.01)
G06T 7/00 (2017.01)

(52) U.S. Cl.
CPC ............ G06T 2207/10081 (2013.01); G06T 2207/10132 (2013.01); G06T 2207/20081 (2013.01); G06T 2211/424 (2013.01)

(56) References Cited

U.S. PATENT DOCUMENTS

| | | | |
|---|---|---|---|
| 6,081,580 A | 6/2000 | Grodzins et al. |
| 6,120,180 A | 9/2000 | Graumann |
| 6,139,183 A | 10/2000 | Graumann |
| 6,196,715 B1 | 3/2001 | Nambu et al. |
| 6,206,566 B1 | 3/2001 | Schuetz |
| 6,222,902 B1 | 4/2001 | Lin et al. |
| 6,256,370 B1 | 7/2001 | Yavuz |
| 6,292,530 B1 | 9/2001 | Yavus et al. |
| 6,389,104 B1 | 5/2002 | Bani-Hashemi et al. |
| 6,400,789 B1 | 6/2002 | Dafnl |
| 6,442,288 B1 | 8/2002 | Haerer et al. |
| 6,483,890 B1 | 11/2002 | Malamud |
| 6,491,430 B1 | 12/2002 | Seissler |
| 6,582,120 B2 | 6/2003 | Schomberg |
| 6,654,149 B1 | 11/2003 | Sheng |
| 6,731,283 B1 | 5/2004 | Navab |
| 6,782,287 B2 | 8/2004 | Grzeszczuk et al. |
| 6,814,489 B2 | 11/2004 | Jensen et al. |
| 6,940,943 B2 | 9/2005 | Claus et al. |
| 7,167,538 B2 | 1/2007 | Strobel et al. |
| 7,245,698 B2 | 7/2007 | Pang et al. |
| 7,356,113 B2 | 4/2008 | Wu et al. |
| 7,369,695 B2 | 5/2008 | Zettel et al. |
| 7,433,507 B2 | 10/2008 | Jabri et al. |
| 7,478,949 B2 | 1/2009 | Niessen et al. |
| 7,494,278 B2 | 2/2009 | Ritter |
| 7,558,366 B2 | 7/2009 | Barth et al. |
| 7,620,223 B2 | 11/2009 | Xu et al. |
| 7,628,538 B2 | 12/2009 | Dehler |
| 7,630,753 B2 | 12/2009 | Simon et al. |
| 7,684,542 B2 | 3/2010 | Blohm et al. |
| 7,712,961 B2 | 5/2010 | Horndler et al. |
| 7,742,557 B2 | 6/2010 | Brunner et al. |
| 7,756,567 B2 | 7/2010 | Kuduvalli et al. |
| 7,766,548 B2 | 8/2010 | Dehler et al. |
| 7,806,588 B2 | 10/2010 | Brunner et al. |
| 7,835,784 B2 | 11/2010 | Mire et al. |
| 7,869,561 B2 | 1/2011 | Dafni |
| 7,936,858 B2 | 5/2011 | Hashemi et al. |
| 7,996,064 B2 | 8/2011 | Simon et al. |
| 8,041,094 B2 | 10/2011 | Bernard et al. |
| 8,094,773 B2 | 1/2012 | Boese et al. |
| 8,189,735 B2 | 5/2012 | Khare et al. |
| 8,254,518 B2 | 8/2012 | Paidi et al. |
| 8,320,612 B2 | 11/2012 | Knobel et al. |
| 8,472,685 B2 | 6/2013 | Chien et al. |
| 8,594,407 B2 | 11/2013 | Jerebko et al. |
| 8,767,909 B2 | 7/2014 | Vogtmeier |
| 8,774,355 B2 | 7/2014 | Claus et al. |
| 9,020,230 B2 | 4/2015 | Yu et al. |
| 9,993,215 B2 | 6/2018 | Lou et al. |
| 2004/0066880 A1 | 4/2004 | Oikawa |
| 2005/0078861 A1 | 4/2005 | Usikov |
| 2005/0123089 A1 | 6/2005 | Man |
| 2005/0135664 A1 | 6/2005 | Kaufhold et al. |
| 2006/0097131 A1 | 5/2006 | Ohara |
| 2006/0098855 A1 | 5/2006 | Gkanatsios et al. |
| 2006/0142984 A1 | 6/2006 | Weese et al. |
| 2006/0251313 A1 | 11/2006 | Lievin et al. |
| 2007/0025509 A1 | 2/2007 | Pang et al. |
| 2007/0040854 A1 | 2/2007 | Lievin et al. |
| 2007/0100234 A1 | 5/2007 | Arenson et al. |
| 2008/0009717 A1 | 1/2008 | Herrmann et al. |
| 2008/0095300 A1 | 4/2008 | Zingelewicz et al. |
| 2009/0068620 A1 | 3/2009 | Knobel et al. |
| 2009/0086889 A1 | 4/2009 | Hashemi et al. |
| 2009/0092225 A1 | 4/2009 | Boese et al. |
| 2009/0136902 A1 | 5/2009 | Zundorf et al. |
| 2009/0175418 A1 | 7/2009 | Sakurai et al. |
| 2009/0191509 A1 | 7/2009 | Zudorf et al. |
| 2009/0198124 A1 | 8/2009 | Adamus et al. |
| 2009/0202046 A1 | 8/2009 | Brunner et al. |
| 2009/0297011 A1 | 12/2009 | Brunner et al. |
| 2010/0067231 A1 | 3/2010 | Simon et al. |
| 2010/0124311 A1 | 5/2010 | Enomoto et al. |
| 2010/0246778 A1 | 9/2010 | Heigl et al. |
| 2010/0284601 A1 | 11/2010 | Rubner et al. |
| 2010/0292565 A1 | 11/2010 | Meyer et al. |
| 2011/0058647 A1 | 3/2011 | Star-Lack et al. |
| 2011/0064286 A1 | 3/2011 | Chien et al. |
| 2011/0075794 A1 | 3/2011 | Boese et al. |
| 2011/0080996 A1 | 4/2011 | Paidi et al. |
| 2011/0135173 A1 | 6/2011 | Elbaroudi et al. |
| 2011/0210261 A1 | 9/2011 | Mauer, Jr. |
| 2011/0282181 A1 | 11/2011 | Wang et al. |
| 2012/0008734 A1 | 1/2012 | Thomson et al. |
| 2012/0087466 A1 | 4/2012 | Klingenbeck |
| 2012/0207373 A1 | 8/2012 | Grass et al. |
| 2012/0243655 A1 | 9/2012 | Ninomiya et al. |
| 2012/0302880 A1 | 11/2012 | Tian et al. |
| 2013/0294570 A1 | 11/2013 | Hansis |
| 2015/0103969 A1 | 4/2015 | Flohr et al. |
| 2015/0125059 A1 | 5/2015 | Holmes et al. |
| 2015/0201890 A1 | 7/2015 | Maidment et al. |
| 2015/0254816 A1 | 9/2015 | Carlson et al. |
| 2016/0163073 A1 | 6/2016 | Grass et al. |
| 2017/0076198 A1 | 3/2017 | Jin et al. |
| 2017/0178365 A1* | 6/2017 | Raupach .............. G06T 11/003 |
| 2018/0018757 A1* | 1/2018 | Suzuki ................ G06T 3/4053 |
| 2018/0374245 A1* | 12/2018 | Xu ........................ G06T 11/005 |
| 2019/0108441 A1* | 4/2019 | Thibault .............. G06N 20/00 |
| 2019/0325618 A1 | 10/2019 | Yang et al. |
| 2020/0085392 A1* | 3/2020 | Lanza .................. H01J 35/065 |
| 2021/0150779 A1* | 5/2021 | Anastasio ............ A61B 6/032 |

FOREIGN PATENT DOCUMENTS

| | | | |
|---|---|---|---|
| DE | 102007037966 A1 | 2/2009 |
| DE | 102009043421 A1 | 4/2011 |
| EP | 3150124 A1 | 4/2017 |
| JP | H4-226641 A | 8/1992 |
| JP | H9-294192 A | 9/1997 |
| JP | H10-295680 A | 11/1998 |
| JP | 2009160307 A | 7/2009 |
| JP | 2010057731 A | 3/2010 |
| JP | 2014518133 A | 7/2014 |
| JP | 2002078708 A | 3/2019 |
| JP | 2004141656 A | 5/2020 |
| WO | WO 2007/115825 A1 | 10/2007 |
| WO | WO 2011134676 A2 | 11/2011 |
| WO | WO 2013002805 A1 | 1/2013 |

OTHER PUBLICATIONS

Davidhazy; "Slip Scan and Strip Photography Overview"; Imaging and Photographic Technology, School of Photo Arts and Sciences, Rochester Institute of Technology; http://web.archive.org/web/

(56) References Cited

OTHER PUBLICATIONS

20100704083756/http://people.rit.edu/andpph/test-streak-strip-scanning-imaging-overview.html (accessed from archive.org Jul. 4, 2010); 6 pages.

Galigekere et al.; "Cone-beam Reprojection Using Projection Matrices"; IEEE Transactions on Medical Imaging; (2003); pp. 1202-1214; vol. 22, Issue 10; IEEE.

Gordon et al.; "Algebraic Reconstruction Techniques (ART) for Three-dimensional Electron Microscopy and X-ray Photography"; Journal of Theoretical Biology; (1970); pp. 471-481; vol. 29.

Joshi et al.; "DigiWarp: a method for deformable mouse atlas warping to surface topographic data." Phys Med Bio. Oct. 21, 2010: 55(20): 6197-6214; (Year: 2010).

Lyra et al.; "Filtering in SPECT Image Reconstruction." International Journal of Biomedical Imaging vol. 2011, Article ID 693795 (Year: 2011).

Schlemper et al.; "A Deep Cascade of Convolutional Neural Networks for MR Image Reconstruction;" In: Cornell University Library; (Mar. 1, 2017); 12 pages; [online] [retrieved on Dec. 27, 2018]; Retrieved from <URL: https://arxiv.org/abs/1703.00555 >.

Sidky et al.; "Accurate image reconstruction from few-views and limited-angle data in divergent-beam CT"; Journal of X-Ray Science and Technology; (2006); pp. 119-139; vol. 14; IOS Press.

Wu et al.; "Iterative Low-Dose CT Reconstruction with Priors Trained by Artificial Neural Network." IEEE Transaction On Medical Imaging, vol. 36, No. 12; Sep. 15, 2017; pp. 2479-2486.

Farsiu et al.; "Fast and Robust Multiframe Super Resolution;" IEEE Transactions on Image Processing; (Oct. 2004); pp. 1327-1344; vol. 13, No. 10; <doi: 10.1109/TIP.2004.834669 >.

Sunnegardh; "Iterative Filtered Backprojection Methods for Helical Cone-Beam CT;" [Dissertation]; Linköping Studies in Science and Technology; (Aug. 2009); 180 pages; No. 1264.

Zhu et al.; "Unpaired Image-to-Image Translation using Cycle-Consistent Adversarial Networks;" IPSJ SIG Technical Report; (2017); 19 pages; vol. 2017-CG-167, No. 5; English Translation included.

\* cited by examiner

IMAGE RECONSTRUCTION USING MACHINE LEARNING REGULARIZERS

RELATED APPLICATIONS

This application claims priority to U.S. Provisional Application No. 62/562,165, filed Sep. 22, 2017, and U.S. Provisional Application No. 62/624,663, filed Jan. 31, 2018, which are incorporated herein by reference.

BACKGROUND

Tomography is imaging a 3D object by sections or sectioning, through the use of various penetrating waves. Tomographic reconstruction is a mathematical procedure used to reconstruct a 3D image of an object. For example, x-ray computed tomography can produce an image from multiple projectional radiographs. Tomographic reconstruction is a type of multidimensional inverse problem involving the challenge of yielding an estimate of a specific object from a finite number of projections. Data insufficiency leads to reconstruction artifacts that may vary in severity depending on a particular problem, the reconstruction method used, and the object being imaged. Machine learning has been used in tomographic problems where data is insufficient. However, a challenge associated with machine learning is that a machine learning model may introduce bias from a learning dataset used to train the machine learning model. In the past, the use of machine learning in post processing of tomographic reconstruction to improve reconstruction has resulted in either accepting training data bias introduced by a machine learning model or limiting the aggressiveness with which machine learning can be used.

SUMMARY

Embedded machine learning models can be used as regularizers within an iterative reconstruction method in order to limit bias introduced by training data while making proficient use of imaged objects to improve the quality of the image reconstruction. A framework to improve the quality of image reconstruction that limits learning dataset bias by maintaining consistency with the observed data is described herein. Machine learning models can be embedded as regularizers in the reconstruction process to introduce expected features and characteristics of a likely imaged object and/or to reduce artifacts introduced by the reconstruction method. Minimization of the objective function keeps the solution consistent with observations and limits the bias introduced by the machine learning regularizers, improving the quality of the reconstruction. The technology can be used as a general framework which can be applied to any image reconstruction problem that may be limited by data insufficiency (e.g. MR, CT, tomosynthesis, ultrasound, and the like).

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
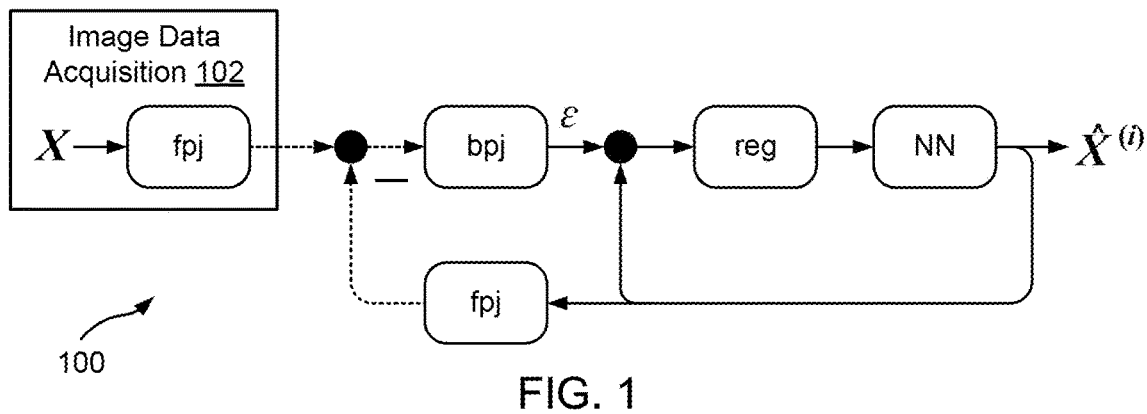
FIG. 1 is a schematic of a deep learning regularizer (NN) embedded in an iterative reconstruction technique in accordance with an example of the present technology.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a regularizer" includes reference to one or more of such features and reference to "subjecting" refers to one or more such steps.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein, "regularizer" refers to a model used in an ill-posed inverse problem to introduce prior information and to bias the solution towards a class of expected solutions. Typical regularizers in tomographic reconstruction are density constraints (for example, positivity constraint) and smoothness constrains (for example total variation), although others can be used.

As used herein, "machine learning" refers to methods to identify and develop complex, multi-parametric, process models based on the input and outputs of a modeled process.

As used herein, "deep learning regularizer" or "rich prior regularizers" refer to multi-parametric regularizers that are sufficiently complex so as to predict anatomical shapes and minimize unnatural reconstruction artifacts. Most often these regularizers incorporate more than ten, more than twenty, or more than 30, and in some cases more than 100, 1,000, or more than 1,000,000 parameters. A rich prior regularizer can often use a non-linear convolution neural network trained via machine learning.

As used herein, a rich prior regularizer trained via Machine Learning is referred to as a Machine Learning Model.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of" For example, "at least one of A, B and C" explicitly includes only A, only B, only C, and combinations of each.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Present Technology

A technology is described for an imaging system configured to use an iterative reconstruction technique that includes a machine learning model as a regularizer to reconstruct an image of a target object. The machine learning model can be trained prior to deploying the machine learning to an imaging system using multiple learning datasets in order to limit bias introduced by training data. The machine learning model can then be deployed to the imaging system where the machine learning model can be included in the iterative reconstruction technique to introduce features and characteristics of an imaged target object as part of reconstructing an image of the target object.

In one example, the machine learning model can be trained using at least two learning datasets which include images that correspond to an object that is to be imaged using an imaging technique, including, but not limited to: medical imaging, computed tomography (CT), tomosynthesis (including real-time cone beam tomosynthesis), diagnostic imaging, interventional and surgical imaging. The machine learning model can include, but is not limited to, neural network (NN) models, convolutional neural network (CNN) models, deep neural network (DNN) models, and the like. The leaning datasets can include high quality (high resolution) and lower quality (low resolution) images, and in some cases manufactured or simulated data. The high quality images can provide ground truth data or objective data used for supervised learning of the machine learning model, and the lower quality images can be provided as learning input to the machine learning model. Accordingly, the machine learning model can be trained using the learning datasets. Furthermore, such machine learning models can reduce and remove reconstruction artifacts, poor implementation algorithms, coding errors, sub-optimal designs, etc. Data augmentation can also be performed in order to improve the training dataset. Data augmentation can include, but is not limited to, flipping images across a central axis (e.g. up-down, right-left, etc), scaling, zoom, etc. Similarly, learning and training datasets can include data collected from various imaging modalities (e.g. MR data can be used in a ML regularizer in a CT reconstruction).

After training, the machine learning model can be provided to the imaging system for use as a regularizer in the iterative reconstruction technique that reconstructs images of target objects. The imaging system can be configured to perform image reconstruction of target objects using imaging data acquired by the imaging system and the iterative reconstruction technique that includes the machine learning model. For example, the imaging system can be configured to use prior information about a target object and current image data obtained using an imaging modality to produce a reconstructed image of the target object via the iterative reconstruction process that incorporates the machine learning model to refine features in the reconstructed image. In some examples, the machine learning model can be updated via refinement training of the machine learning model using image data generated by the imaging system. As an example, the machine learning model can be updated during one or more stages of the iterative reconstruction technique using image data presently generated by the imaging system.

The present technology addresses problems associated with past uses of machine learning to reconstruct images. For example, a machine learning model may introduce bias from a learning dataset used to train the machine learning model. Consequently, in the past, users either had to accept training data bias introduced by the machine learning model, or the users had to limit the aggressiveness with which machine learning was used to reconstruct an image. As a result of the present technology, the bias introduced by the machine learning can be minimized or eliminated. For example, when a machine learning model is used, regularized early image reconstructions can be further reconstructed using an iterative reconstructive process to recover data consistency and remove the bias introduced by the machine learning model, which may be evident in the later image reconstructions. Along with recovering data consistency, image artifacts can be removed when later image reconstructions are passed through a later machine learning model, which can result in an artifact-free, unbiased image reconstruction.

To further describe the present technology, examples are now provided with reference to the figures. FIG. 1 is a schematic of an iterative reconstruction technique 100 that includes a deep learning neural network (NN) regularizer embedded in the iterative reconstruction technique 100 used to reconstruct an image. In one example, the iterative reconstruction technique 100 can start with an image data acquisition 102 step, wherein image data can be obtained from an imaging modality, including, but not limited to, computer tomography (CT), x-ray, ultrasound, or magnetic resonance imaging (MRI). For example, an image volume X can be generated by taking multiple projections of a target object from multiple angles to produce multiple images from various angles (e.g. for production of a 3D image). A target object can include, but is not limited to, various anatomies, structures, or compositions of a human, animal, artifact, and/or specimen.

The image volume X can be forward-projected (fpj) to produce a set of two-dimensional (2D) projections or measured data (e.g. raw MRI data). The image volume X can provide ground truth data (e.g., observational data). The dash lines illustrated in FIG. 1 represent 2D projection data in detector coordinates, and the solid black lines denote three-dimensional (3D) volume data in a world coordinate system. The difference between the acquired images and the forward projection of the image reconstruction can be back-projected (bpj) into the 3D space to obtain an update volume $\varepsilon$. After the update is added to the image reconstruction, a deep learning regularizer, such as a neural network (NN), can produce an updated solution $\hat{X}^{(i)}$. Notably, the deep learning regularizer can operate in a registered framework, such that it is easier for the regularizer to add features and remove artifacts, as they work out of a registered image that gets improved. Artifacts may be related to the specific geometry of the system, thus inherent registration helps improve the reconstruction method.

The deep learning NN regularizer can be trained to learn prior information about a target object represented in the image volume X, and the deep learning NN regularizer can be embedded in the iterative reconstruction technique 100 used to reconstruct an image of the target object represented in the image volume X Each step of the iterative reconstruction process may improve the quality of the image reconstruction, and the deep learning NN regularizer can be used to confine the solution space by incorporating prior knowledge about the target object. For example, knowledge that images of a target object being imaged contains only positive values, or that images of the target object have a specified level of smoothness across uniform regions can be enforced using respectively, a positivity or smoothness constraint within the iterative reconstruction technique 100. FIG. 1 illustrates that the NN regularizer can be used in addition to standard regularizers. NN regularizers are linear and ultimately also learn to apply similar constraints. For example, positivity constraints corresponding to levels between air (−1000 HU) and water (0 HU) can generally be used to reduce tomosynthesis artifacts. Smoothness can be imposed by regularizing with total variation (TV).

Including the deep learning NN regularizer in the iterative reconstruction technique 100 can drive the solution towards a plausible physical solution at an accelerated rate, yielding an improved convergence of the iterative reconstruction technique 100. The iterative reconstruction technique 100 enables contextual and localized features to be identified using a contracting and symmetric expanding path. In one example, the deep learning NN regularizer can be trained as a regression network using a Euclidean loss function on 2D slices from a reconstructed volume and ground truth respectively. Practically it may not be beneficial to train the deep learning NN regularizer after each iteration of the iterative reconstruction process. In cone beam CT or cone beam tomosynthesis, it can be more advantageously trained as a regression network using a loss on 3D volumes. Thus, in some examples, the deep learning NN regularizer can be periodically trained after a number of iterations of the iterative reconstruction process. As a non-limiting example, 10 iterations (⅕th the total number of iterations) of the iterative reconstruction process can be run, and then the deep learning NN regularizer can be trained (e.g., using a second learning dataset), and predictions output by the deep learning NN regularizer can be input to the loop of the iterative reconstruction technique 100. However, as a general guideline anywhere from about 1 iteration to 100 iterations can occur between iteration steps, and in many cases from 5 to 10 iterations. In one example, the second learning dataset can include actual image data of a target object being scanned. For example, the target object can be scanned, and the image data generated by the scan can be used to further train the deep learning NN regularizer between iterations of the iterative reconstruction process.

As described later in greater detail, training the deep learning NN regularizer can be performed using learning datasets which include image data related to a target object which is to be imaged using an imaging modality. The learning dataset can include image scans of target objects collected from, for example, a population of individuals, which can include an individual who is to be scanned. Image data acquisition 102 can be simulated by virtually scanning the learning dataset (e.g., a virtual patient). In using a learning dataset to train the deep learning NN regularizer, the solution can be known (e.g., the learning dataset can provide a clear picture of a target object), and as such, the learning dataset can be used as ground truth data in the training process of the deep learning NN regularizer. After training the deep learning NN regularizer, the trained deep learning NN regularizer can be fitted as the NN block shown in FIG. 1 of the iterative reconstruction technique 100.

Figure 2:
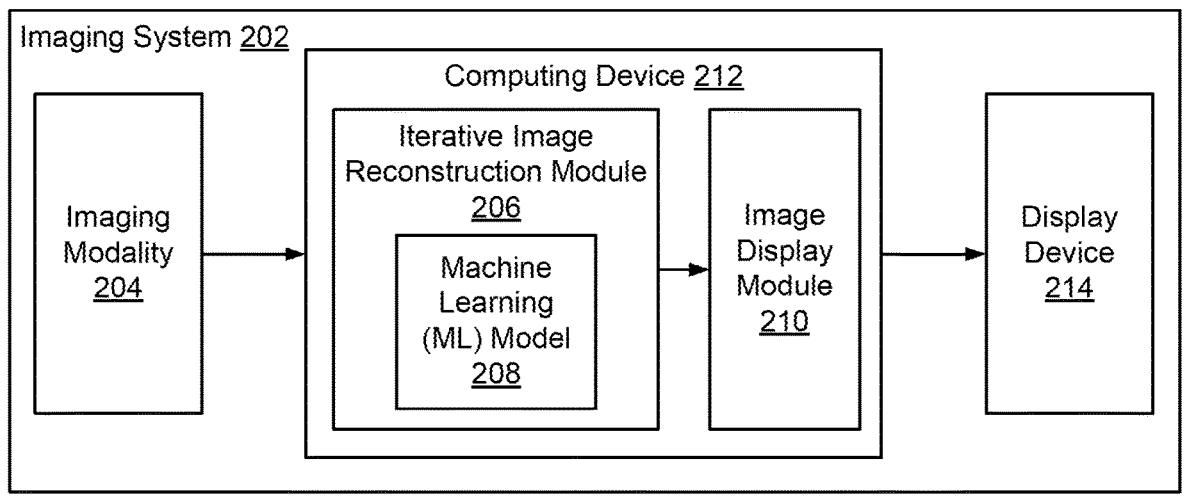
FIG. 2 is a block diagram illustrating an example imaging system configured to use an iterative reconstruction technique that includes a machine learning model as a regularizer in accordance with an example of the present technology.

FIG. 2 is a block diagram illustrating an example imaging system 202 configured to use the iterative reconstruction technique described above. As illustrated, the imaging system 202 can include an imaging modality 204 configured to generate an image dataset for a target object, a computing device 212 used to host an iterative image reconstruction module 206 configured to execute an iterative reconstruction technique that utilizes a machine learning model 208 as a regularizer to reconstruct an image of a target object, and an image display module 210 configured to display a reconstructed image.

The components of the imaging system 202 may be contained in a workstation, or the components of the imaging system 202 may be located separately and can be configured to communicate with one another over a network (e.g., local area network (LAN), wide area network (WLAN), short range network protocol, etc.). The imaging modality 204 can be any imaging device that incorporates, for example, imaging technologies of x-ray radiography, x-ray computed tomography, magnetic resonance imaging, medical ultrasonography or ultrasound, endoscopy, elastography, tactile imaging, thermography, and/or medical photography and nuclear medicine functional imaging techniques as positron emission tomography (PET) and single-photon emission computed tomography (SPECT). In one example, the imaging modality 204 can be a computed tomography (CT) scanner, a tomosynthesis system, or an ultrasound imaging system. As will be appreciated, imaging modalities that are not specifically described herein are also within the scope of this disclosure. For example, imaging systems such as those described in U.S. Pat. No. 10,070,828 and U.S. Application Publication No. 2017-0200271-A1 (both of which are incorporated herein by reference) are particularly effective systems for image reconstruction.

As indicated, the computing device 212 can be configured to host the iterative image reconstruction module 206, which when executed on the computing device 212, reconstructs an image of a target object using an iterative reconstruction technique that includes a machine learning model 208 as a regularizer to introduce object features and constraints (e.g., densities, borders, curves, etc.) into the image of the target object being reconstructed. After one or more iterations of the reconstruction process for reconstructing the image of the target object, output of the machine learning model 208 can be provided as input to a next iteration of the reconstruction process. In one example, as described in association with FIG. 5, the iterative image reconstruction module 206 can include a plurality of machine learning models 208 used as regularizers at different stages of an iterative reconstruction technique.

The machine learning model can be trained to identify object features using learning datasets that include image data related to the target object which is to be imaged using the imaging modality 204, and the machine learning model 208 can be used as a regularizer to introduce the object features into the image of the target object being reconstructed. In one example, the machine learning model 208 can be a convolutional neural network (CNN) trained as a regression network using a Euclidean loss function, and the learning datasets used to train the CNN can include 3D volume data and/or 2D slices of a reconstructed image volume (e.g., a collection of reconstructed images) and a ground truth image volume (e.g., a collection of ground truth images comprising actual images of objects). In one example, as described in association with FIG. 3, the machine learning model 208 can be trained using remote computing resources and the machine learning model 208 can be deployed to the computing device 212 for use by the iterative image reconstruction module 206.

The computing device 212 can comprise a processor-based system and can include any such device capable of receiving image data from a imaging modality 204 and outputting reconstructed image data to the image display module 210, as well as hosting the iterative image reconstruction module 206. The image display module 210 can be configured to output a reconstructed image to a display device 214, including a monitor, mobile device, or other type of display for presentation of the reconstructed image to a user, such as a medical professional.

Figure 3:
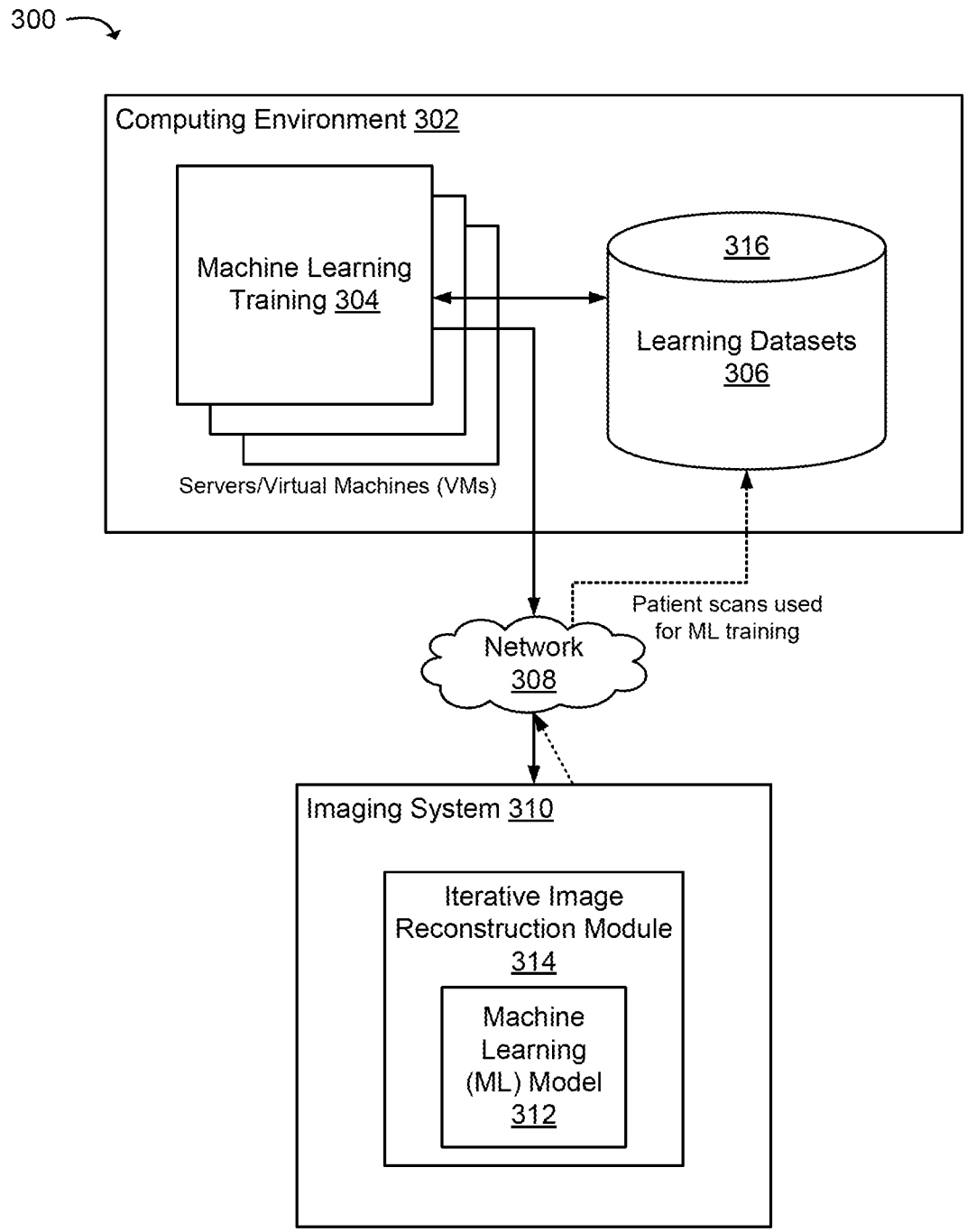
FIG. 3 is a block diagram that illustrates an example system that includes a computing environment in communication with an imaging system in accordance with an example of the present technology.

FIG. 3 is a block diagram that illustrates an example system 300 which includes a computing environment 302 (e.g., a "cloud" environment) and an imaging system 310 as described in relation to FIG. 2. The computing environment 302 can include computing resources for training a machine learning model 312. In one example, the computing resources can be configured for executing virtual machines (e.g., computing instances) which can be used for machine learning training 304, where a virtual machine can be an instance of a software implementation of a machine (i.e. a computer) configured to emulate a physical machine. In one example, the computing environment 302 can be a managed service provided by a computing service provider (e.g., a "cloud" provider) where the computing resources include GPUs.

Figure 4:
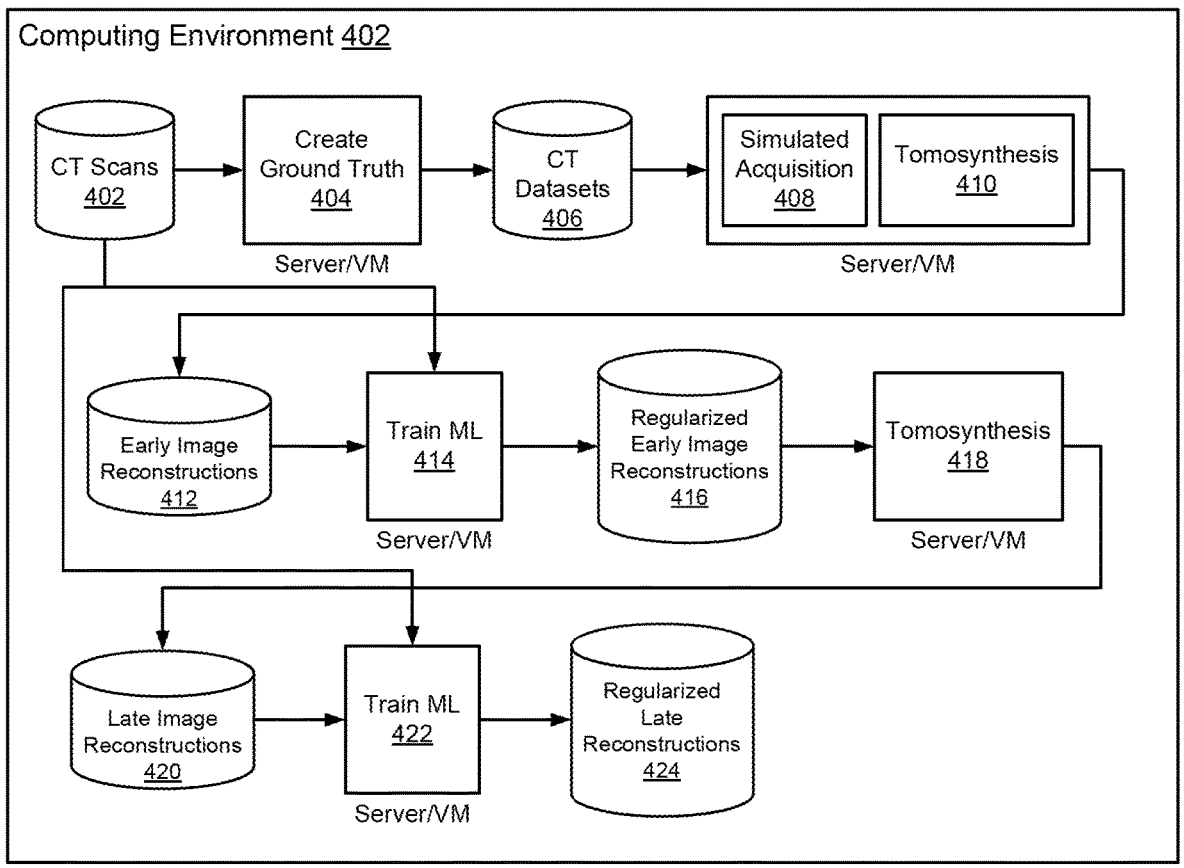
FIG. 4 is a flow diagram that illustrates an example of training a machine learning model using learning datasets and testing the machine learning model as a regularizer in an image reconstruction process in accordance with another example of the present technology.

In one example, the machine learning model 312 can be trained using learning datasets 306 and the computing resources in the computing environment 302. The learning datasets 306 can include image data (e.g., CT scans of target objects to be scanned using the imaging system 310) obtained from a diverse set of institutions, scanning devices, and individuals which provides a large variability in the learning datasets 306. FIG. 4 illustrates an example of training a machine learning model 312 using learning datasets 306 and testing the machine learning model 312 as a regularizer in an image reconstruction process. As illustrated in FIG. 4, CT scans 402 can be used to create ground truth data 404 which can be included in CT datasets 406 used for machine learning training 304. Simulated acquisition 408 can be performed where the CT datasets 406 are virtually scanned to simulate scanning of a target object. In the simulation, the solution can be known and the CT datasets 406 can be used as ground truth in training the machine learning model 312.

Figure 5:
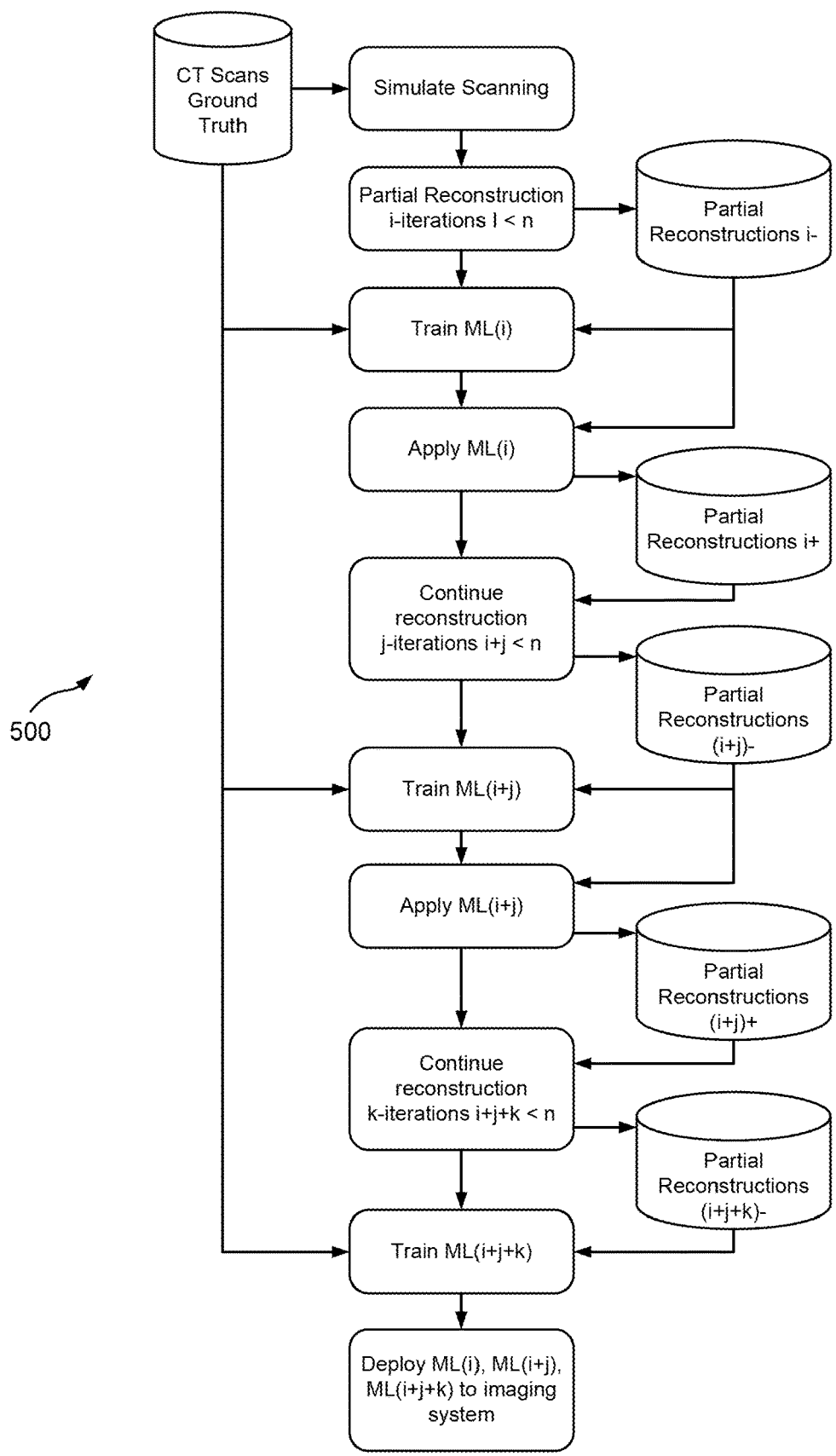
FIG. 5 is a flow diagram illustrating an example method for training a plurality of machine learning models which can be incorporated as regularizers at different stages of an iterative reconstruction technique in accordance with another example of the present technology.

Tomosynthesis 410 can be performed using the CT datasets 406 to generate early image reconstructions 412, which can be used as a training dataset to train 414 the machine learning model 312. Regularized early image reconstructions 416 generated by the training 414 can be used to continue tomosynthesis 418. Late image reconstructions 420 generated by tomosynthesis 418 can be used for further training 422 of the machine learning model 312 and to generate regularized late reconstructions 424. In yet another alternative, CT scans 402 can be used to directly update and as input to the deep learning regularizers as training 414 and 422. The training process can include slicing the ground truth images and reconstructed images along the axial plane to generate 2D slices which can be used to train the machine learning model 312 using a Euclidean loss. Also, the machine learning model 312 can be trained with stochastic gradient descent implemented using dataflow programming that utilizes a symbolic math library (e.g., open-source software library TensorFlow). Initial weights for the machine learning model 312 can be drawn from a Gaussian distribution with a standard deviation of $\sqrt{2/T}$ where T represents a number of incoming nodes of one neuron in an artificial neural network. Alternatively, initial weights can be assigned a common value or a randomized value. The training data can be used to adjust the weights of the machine learning model 312 with the goal of teaching the machine learning model 312 to predict the ground truth (i.e., the desired outcome) using available data. A percentage of the training data can be used to validate machine learning training in order to minimize overfitting. An energy function can be computed as a Euclidean loss over a final feature map. The Euclidean loss layer can compute the sum of squares of differences of the predictions and the ground truth, where the Euclidean loss given as $$E = \frac{1}{2N} \sum_{i=1}^{N} \|x_i - y_i\|_2^2$$

where $x_i$ and $y_i$ represent input and ground truth intensities, and N is a total number of pixels. In one example, as illustrated in FIG. 5, a method 500 can be used to train a plurality of machine learning models which can be incorporated as regularizers at different stages of an iterative reconstruction technique. Also, in some examples, the iterative reconstruction technique can include one or more regularizing filters (i.e., non-machine learning regularizing filters) which incorporate prior knowledge about a target object into the reconstruction process to reconstruct an image of the target object. As will be appreciated, any number of and/or types of machine learning regularizers filter and non-machine learning regularizing filters can be included in the iterative reconstruction technique.

Returning to FIG. 3, after training, the machine learning model 312 can be deployed to the imaging system 310. The machine learning model 312 can be incorporated as a regularizer in an iterative reconstruction technique used by an iterative image reconstruction module 314 to reconstruct images. Also, in some examples, the machine learning model 312 can be periodically trained/retrained using the computing resources in the computing environment 302 and the machine learning model 312 can be redeployed to the imaging system 310.

In one example, image datasets generated by the imaging system 310 can be sent to a data store 316 hosted in the computing environment 302, and the image datasets can be used for machine learning training 304. The image datasets can include image scans generated by an imaging modality included in the imaging system 310 and/or reconstructed images generated by the iterative image reconstruction module 314 included in the imaging system 310. Furthermore, multiple imaging systems 310 can be used to update a common computing environment 302. As such, learning datasets 306 can be continuously updated as more imaging systems provide additional scan data which further refines the training datasets.

In an alternative example, the iterative image reconstruction module 314 can be hosted on computing resources in the computing environment 302. The imaging system 310 can communicate with the iterative image reconstruction module 314 via a network 308 to send image data generated by an imaging modality, and in response to receiving the image data, the iterative image reconstruction module 314 can reconstruct an image of a target object using the image data and the iterative reconstruction technique described earlier. The iterative image reconstruction module 314 can cause the reconstructed image to be sent over the network 308 to the imaging system 310, making the reconstructed image available to a user of the imaging system 310.

The various processes and/or other functionality contained within the computing environment 302 can be executed on one or more processors that are in communication with one or more memory modules. The computing environment 302 can include a number of computing devices that are arranged, for example, in one or more server banks or computer banks or other arrangements. The computing devices can support a computing environment using hypervisors, virtual machine monitors (VMMs), GPU, and other virtualization software. The term "data store" can refer to any device or combination of devices capable of storing, accessing, organizing and/or retrieving data, which can include any combination and number of data servers, relational databases, object oriented databases, cluster storage systems, data storage devices, data warehouses, flat files and data storage configuration in any centralized, distributed, or clustered environment. The storage system components of the data store can include storage systems such as a SAN (Storage Area Network), cloud storage network, volatile or non-volatile RAM, optical media, or hard-drive type media. The data store can be representative of a plurality of data stores as can be appreciated.

API calls, procedure calls or other network commands that can be made in relation to modules and services included in the computing environment 302 can be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The network 308 can include any useful computing network, including an intranet, the Internet, a local area network, a wide area network, a wireless data network, or any other such network or combination thereof. Components utilized for such a system can depend at least in part upon the type of network and/or environment selected. Communication over the network can be enabled by wired or wireless connections and combinations thereof.

FIGS. 2-3 illustrate that certain processing modules can be discussed in connection with this technology and these processing modules can be implemented as computing services. In one example configuration, a module can be considered a service with one or more processes executing on a server or other computer hardware. Such services can be centrally hosted functionality or a service application that can receive requests and provide output to other services or consumer devices. For example, modules providing services can be considered on-demand computing that are hosted in a server, virtualized service environment, grid or cluster computing system. An API can be provided for each module to enable a second module to send requests to and receive output from the first module. Such APIs can also allow third parties to interface with the module and make requests and receive output from the modules. While FIGS. 2-3 illustrate examples of systems that can implement the techniques above, many other similar or different environments are possible. The example environments discussed and illustrated above are merely representative and not limiting.

Figure 6:
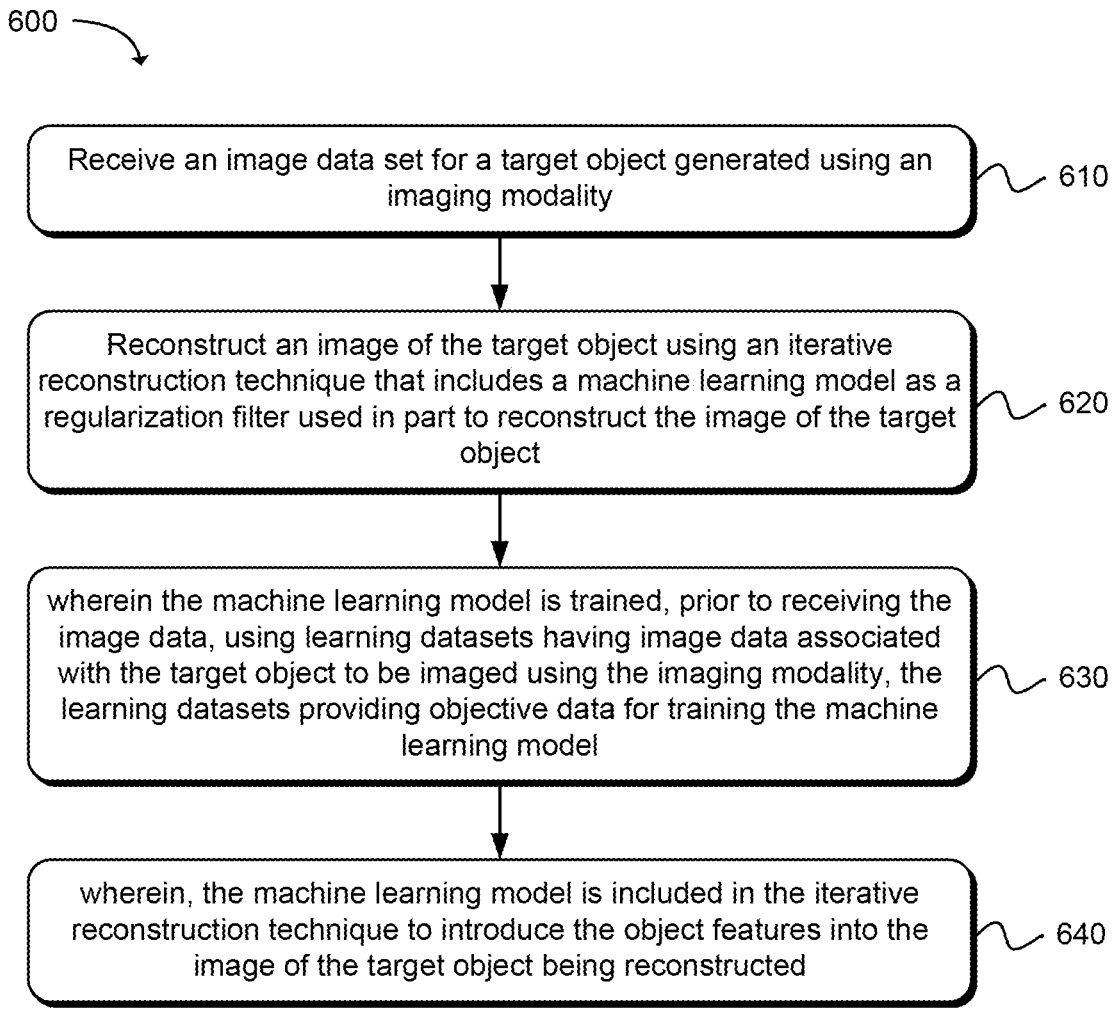
FIG. 6 is a flow diagram that illustrates an example method for reconstructing an image and/or reducing artifacts introduced by the reconstruction method of a target object using an iterative reconstruction technique that includes a machine learning model as a regularization filter in accordance with still another example of the present technology.

FIG. 6 is a flow diagram illustrating an example method reconstructing an image of a target object using an iterative reconstruction technique that includes a machine learning model as a regularization filter. As in block 610, an image data set for a target object generated using an imaging modality can be received. The image data set can be received from an imaging modality configured to generate the image dataset for a target object imaged using the imaging modality. In one example, the imaging modality can include, but is not limited to a computed tomography (CT) scanner, a tomosynthesis system, or an ultrasound imaging system.

As in block 620, an image of the target object can be reconstructed using an iterative reconstruction technique that includes a machine learning model as a regularization filter used in part to reconstruct the image of the target object. As in block 630, the machine learning model can be trained prior to receiving the image data using learning datasets that have image data associated with the target object, which is to be imaged using the imaging modality, wherein the learning datasets provide objective data for training the machine learning model. The machine learning model, in one example, can be a convolutional neural network (CNN) trained as a regression network.

In one example, training the machine learning model can include generating reconstructed images using a simulator and an image volume, and using the reconstructed images and ground truth images to generate 2D images sliced along an axial plane, and training the machine learning model using the 2D images. The reconstructed images can provide an intermediate solution to reconstructing the image of the target object and the reconstructed images can be used to adjust weights to teach the machine learning model to determine the ground truth provided by the ground truth images.

Similarly, the machine learning model can be trained using 3D images. This can be valuable to account for artifacts and patterns which have 3D correlations which would not be apparent from 2D slices alone. Such 3D training datasets can be particularly useful for cone beam CT, cone beam tomosynthesis, and the like.

The learning datasets used to train the machine learning model can include at least two learning datasets, where a first learning dataset comprises a higher quality dataset providing ground truth data, and a second learning dataset comprises a lower quality dataset, as compared to the first learning dataset, which provides training input data for the machine learning model. In one example, the higher quality dataset can include high-dose imaging scans of an object associated with the target object, and the lower quality dataset includes low-dose scans of the object associated with the target object.

As in block 630, the machine learning model is included in the iterative reconstruction technique to introduce the object features into the image of the target object being reconstructed. In one example, the iterative reconstruction technique can include forward projecting a ground truth image volume to produce a two-dimensional (2D) set of projections, determining a difference between the image data set and the 2D set of projections, obtaining an update volume by back projecting the difference into a three-dimensional space, incorporating the update volume into a reconstruction of the image of the target object, and applying the machine learning model to the reconstruction of the image as a regularization filter to produce an updated reconstruction of the image.

After an iteration of the reconstruction process for reconstructing the image of the target object, output of the machine learning model can be provided as input to a next iteration of the reconstruction process. Moreover, in one example, the machine learning model can be updated during execution of the iterative reconstruction technique using the image data generated by the imaging modality, wherein the machine learning model can be trained using the image data during one or more stages of the iterative reconstruction technique.

In one example, the iterative reconstruction technique can include a plurality of machine learning models used as regularizers at different stages of the iterative reconstruction technique, and in some examples, the iterative reconstruction technique can include at least one non-machine learning regularizing filter used as part of reconstructing the image of the target object. Also, in some examples, a learning dataset can be augmented with a patient dataset associated with a patient who is to be scanned using the imaging modality. The learning dataset can be augmented with the patient dataset prior to scanning the patient, after scanning the patient, and/or during scanning of the patient.

Figure 7:
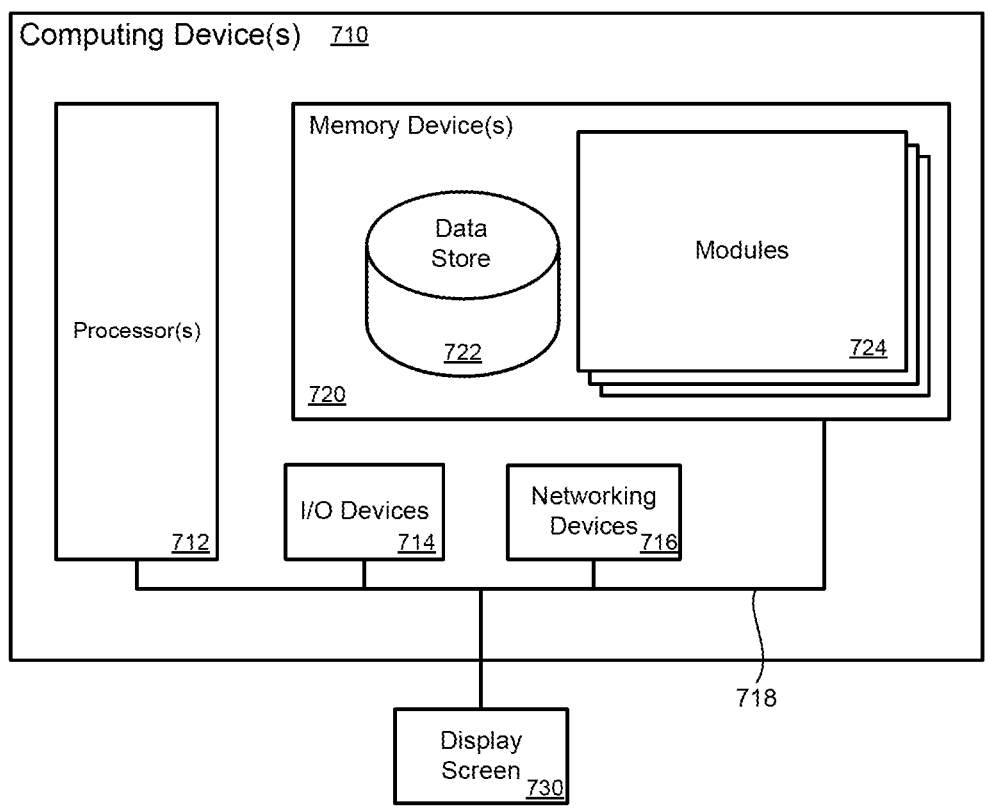
FIG. 7 is block diagram illustrating an example of a computing device that can be used to execute a method for reconstructing an image of a target object using an iterative reconstruction technique in accordance with an example of the present technology.

FIG. 7 illustrates a computing device 710 on which service modules of this technology can execute. A computing device 710 is illustrated on which a high level example of the technology can be executed. The computing device 710 can include one or more processors 712 that are in communication with memory devices 720. The computing device 710 can include a local communication interface 718 for the components in the computing device. For example, the local communication interface 718 can be a local data bus and/or any related address or control busses as may be desired.

The memory device 720 can contain modules 724 that are executable by the processor(s) 712 and data for the modules 724 to provide various services. In one aspect, the memory device 720 can include modules for an iterative image reconstruction module and other modules. A data store 722 can also be located in the memory device 720 for storing data related to the modules 724 and other applications along with an operating system that is executable by the processor(s) 712.

Other applications can also be stored in the memory device 720 and can be executable by the processor(s) 712. Components or modules discussed in this description that can be implemented in the form of software using high-level programming languages that are compiled, interpreted or executed using a hybrid of the methods.

The computing device can also have access to I/O (input/output) devices 714 that are usable by the computing devices. An example of an I/O device is a display screen 830 that is available to display output from the computing device 730. Networking devices 716 and similar communication devices can be included in the computing device. The networking devices 716 can be wired or wireless networking devices that connect to the internet, a LAN, WAN, or other computing network.

The components or modules that are shown as being stored in the memory device 720 can be executed by the processor(s) 712. The term "executable" may mean a program file that is in a form that can be executed by a processor 712. For example, a program in a higher level language can be compiled into machine code in a format that can be loaded into a random access portion of the memory device 720 and executed by the processor 712, or source code can be loaded by another executable program and interpreted to generate instructions in a random access portion of the memory to be executed by a processor. The executable program can be stored in any portion or component of the memory device 720. For example, the memory device 720 can be random access memory (RAM), read only memory (ROM), flash memory, a solid state drive, memory card, a hard drive, optical disk, floppy disk, magnetic tape, or any other memory components.

The processor 712 can represent multiple processors, including, but not limited to Central Processing Units (CPUs), Graphical Processing Units (GPU), FPGAs, or clusters of the above, and the memory device 720 can represent multiple memory units that operate in parallel to the processing circuits. This can provide parallel processing channels for the processes and data in the system. The local communication interface 718 can be used as a network to facilitate communication between any of the multiple processors and multiple memories. The local communication interface 718 can use additional systems designed for coordinating communication such as load balancing, bulk data transfer and similar systems.

EXAMPLES

The technology described herein has been shown to provide benefits associated with image reconstruction when used with various technologies. The following are examples in which the technology has been successfully implemented. Cone beam tomosynthesis (CBT) fluoroscopy is a novel modality which provides near real-time 3D imaging. Real-time performance can be achieved by generating fluoroscopic acquisitions over a circular tomosynthesis geometry and using the fluoroscopic acquisitions for fast model-based reconstructions. CBT-fluoroscopy can be used for image guidance in surgery or interventional radiology. A limitation of CBT-fluoroscopy can be a lack of resolution along the tomosynthesis axis. The technology has been used to improve the quality of CBT-fluoroscopy by using convolutional neural networks (CNNs) as regularizers as part of the tomosynthesis process to improve image resolution.

Different CNNs can be used as regularizers at different stages in the reconstruction process. Early CNNs add more data to an image reconstruction, including along the tomosynthesis axis, but may also add bias from a learning dataset. Late CNNs refine the features of the reconstruction and limit the bias introduced by the learning dataset. The approach can drive the solution towards a likely physical solution, yielding a better and faster convergence of the iterative reconstruction technique.

Performance of the regularizers and the quality of the reconstructions has been analyzed by quantitatively measuring the error at both the early and late stages of tomosynthesis. The bias introduced by the learning dataset has been assessed and statistical analysis has been performed to determine the percentage of cases where the machine learning process decreases the consistency with the observed data.

Implementation and Learning

The acquisition process was simulated by virtually scanning a CT dataset (e.g., a virtual patient) in a CBT-fluoroscopy configuration. In the simulation, the solution was known and the CT datasets were used as ground truth in the learning process of the CNNs. Due to practical considerations associated with training a CNN after every iteration of the reconstruction process, only two distinct CNNs, early CNN and late CNN were trained with a constant learning rate of 1e-2, and momentum of 0.99. Early reconstructions were generated using a few iterations of the iterative reconstruction technique, and the early reconstructions were used as a training dataset to train the early CNN. The ground truth and the training dataset were sliced along the axial plane to generate 2D slices which were used to train the CNN as a regression network. The predictions of the early CNN ("CNN regularized early reconstructions") were used to continue the tomosynthesis process to generate the late reconstructions ("CNN regularized late reconstructions"). The late CNN was applied to the late reconstructions to generate the CNN regularized late reconstructions.

Network Architecture

CNN architecture comprising of an encoder and a decoder were used as a regularizer in the set-up for both the early and late CNNs. The network comprised 4 layers, with 64 feature channels in the first layer. The encoder comprised two 3×3 convolutions followed by a rectified linear unit (ReLu) and a 2×2 max pooling with stride 2 for downsampling. The decoder complemented the encoder, where each layer comprised an upsampling of the feature map followed by an up-convolution of 2×2, followed by two 3×3 convolutions with a ReLu layer. The feature channels were reduced by a factor of two in each downsampling step and doubled after each up-sampling. Skip connections between the encoder and decoder were established by concatenating the layers with the same number of feature channels. The architecture above enables the exploration of contextual and localized features using a contracting and symmetric expanding path. Zero-padding was used in the convolutions, so that the image size remains the same after every convolution. Following the decoding, Euclidean loss was computed following the decoder using a 1×1 convolution to reduce the number of output channels in the last layer of the decoder to one. The Euclidean loss layer used computes the sum of squares of differences of the predictions and the ground truth represented as $$E = \frac{1}{2N} \sum_{i=1}^{N} \|x_i - y_i\|_2^2$$

where $x_i$ and $y_i$ represent the input and the ground truth intensities, N is the total number of pixels. The initial weights for the network were drawn from a Gaussian distribution with a standard deviation of $\sqrt{2/T}$ where T represents the number of incoming nodes of one neuron of the CNN. The network was trained with stochastic gradient descent implemented using TensorFlow, which is an open-source software library for dataflow programming.

Training Data

Figure 8:
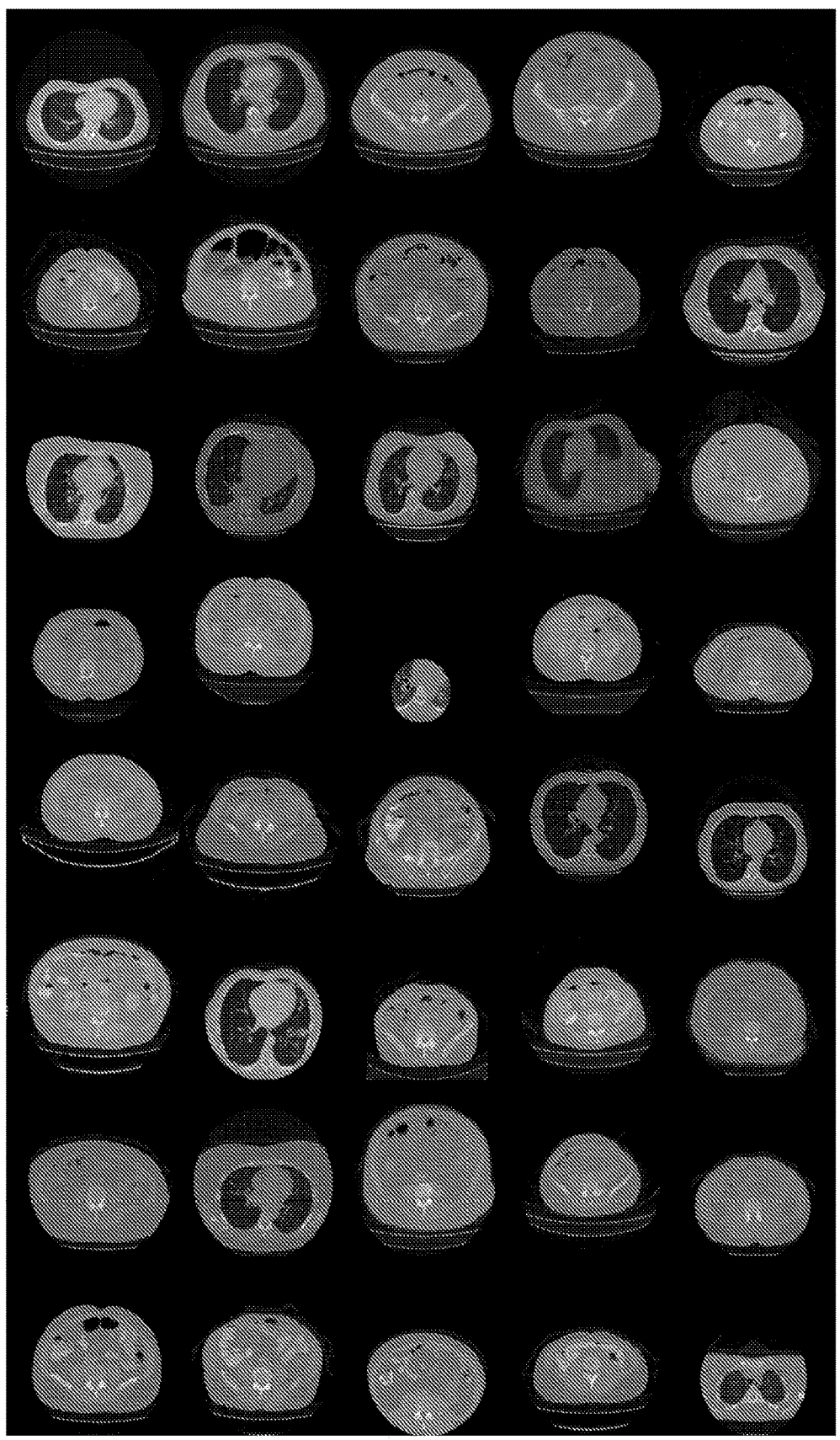
FIG. 8 is random sampling from a source CT dataset to depict the variation in the data set associated with an example implementation of the present technology.

The source dataset comprised 53,000 raw CT scans primarily from across the EU and Latin America. The scans are from a diverse set of institutions, scanners, and individuals, providing a large variability in the learning dataset. The differences in the source dataset include patient sizes, thoracic regions, and patient positions. FIG. 8 provides a pictorial representation of the data variation in the source dataset. A large number (i.e., 9,700) of spinal datasets were extracted from the source dataset and homogenized to a size of 256×256×256. Training of the CNN used three slices per scan. Out of the 9,700 scans, 8,500 scans were used as the training dataset, and 1,200 scans are used as the testing dataset, and 945 scans from the training dataset were used for validation purposes.

Infrastructure

Computing resources located in a computing environment (e.g., a "cloud" environment) was used to generate 3D volumes from CT scans, train CNN regularizers embedded in the reconstruction process, and test the regularizers.

Visual Analysis

Figure 9:
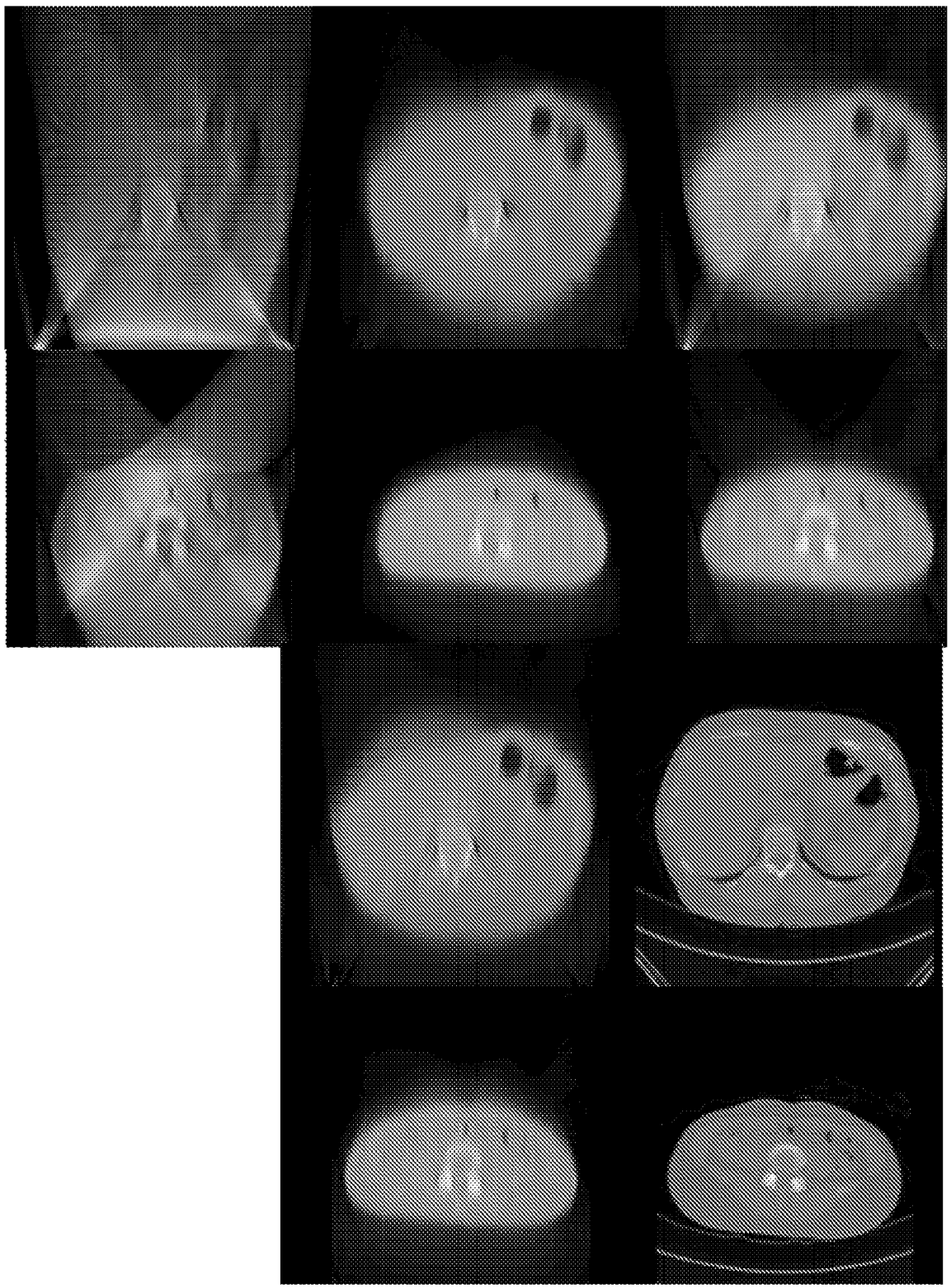
FIG. 9 shows visual results of a lower lumbar region and upper thoracic region for a tomosynthesis process using CNNs as regularizers associated with an example implementation of the present technology.
Figure 10:
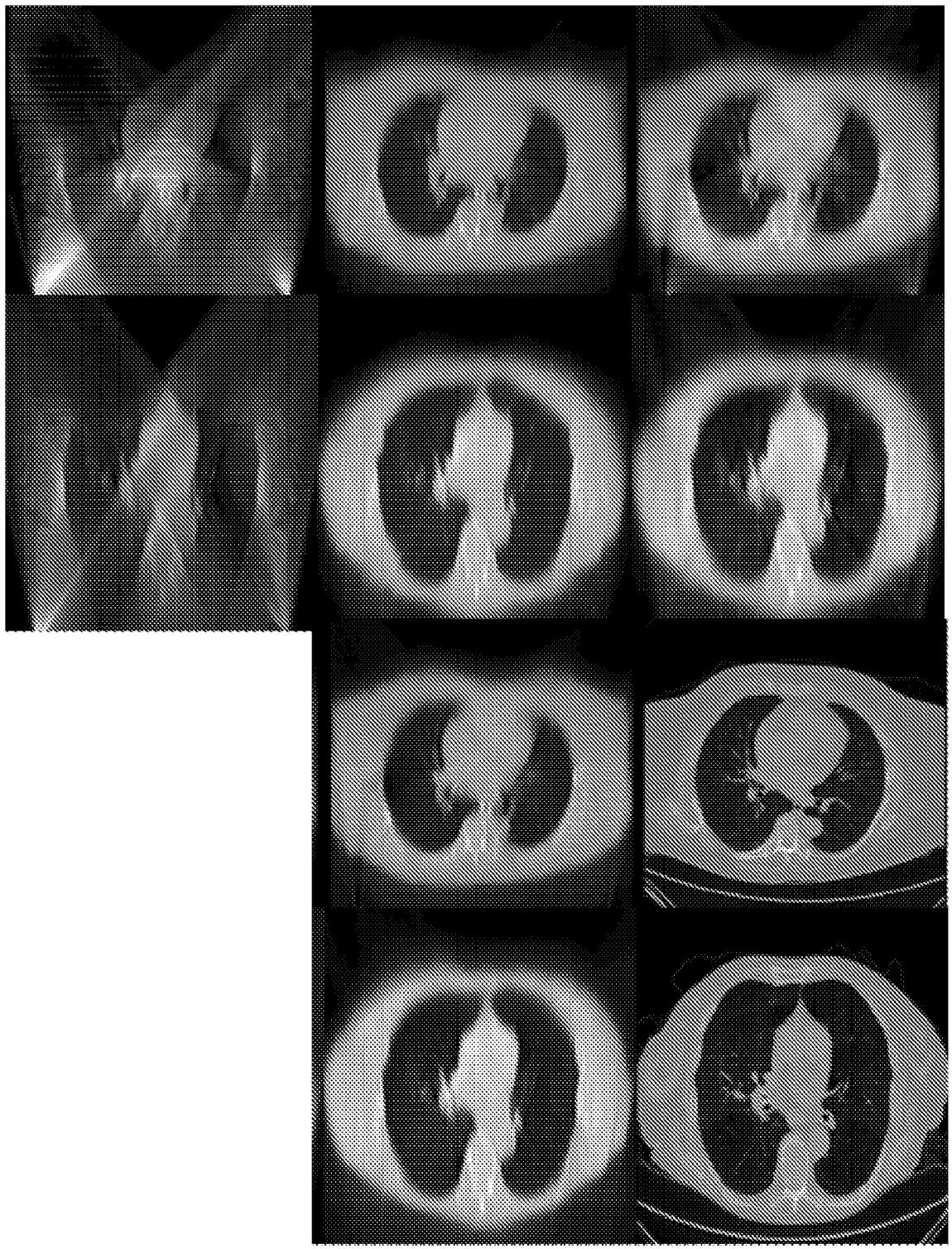
FIG. 10 shows visual results of an upper thoracic region for a tomosynthesis process using CNNs as regularizers associated with an example implementation of the present technology.

The typical datasets used for evaluation were from the upper thoracic and the lower lumbar regions of the body. The reconstructions at different stages of the process for datasets from the lower lumbar region and upper thoracic region are shown in FIG. 9, where from left to right are: early reconstructions, CNN regularized early reconstructions, late reconstructions, CNN regularized late reconstructions, and ground truth. FIG. 10 shows the datasets for the upper thoracic region where from left to right are: early reconstructions, CNN regularized early reconstructions, late reconstructions, CNN regularized late reconstructions, and ground truth.

Artifacts in the early reconstructions introduced by the tomosynthesis process due to insufficient data are reduced resulting in image restoration along the tomosynthesis axis of the CNN regularized early reconstructions. However, generality of the CNN biases the CNN regularized early reconstruction towards the training dataset. For example, FIG. 9 shows a case where the anterior vertebral wall is less visible in the CNN regularized early reconstruction. When the CNN regularized early reconstructions are further reconstructed via the iterative reconstructive process, data consistency can be recovered by removing the bias introduced by the CNN, which can be seen in the late reconstructions. Along with recovering data consistency, method artifacts such as bright corners appear. When the late reconstructions are passed through the late CNN, the artifacts introduced by the tomosynthesis process can be further removed, resulting in an artifact-free, or nearly artifact-free, unbiased reconstruction.

Quantitative Analysis

A quantitative and comparative analysis was performed on both the reconstruction volumes and the projections. Comparisons of the reconstruction volumes versus their ground truths provide measures of the quality of the reconstruction. Cross-correlation between the measured projections and the re-projections of the solutions can be indicative of the consistency with the measured data. Table 1 below shows the average and standard deviation cross-correlation data between the reconstruction volumes and the projections.

TABLE 1

Cross Correlation with respect to Ground Truth

| Avg and Stddev | Comparing Volumes | Comparing Projections |
| --- | --- | --- |
| Early Recon | 4.82E−01 ± 9.91E−02 | 9.40E−01 ± 2:69E−02 |
| CNN regularized Early Recon | 7.82E−01 ± 3:26E−02 | 9.58E−01 ± 1:75E−02 |
| Late Recon | 7.90E−01 ± 3:35E−02 | 9.94E−01 ± 2:98E−03 |
| CNN regularized Late Recon | 8.05E−01 ± 2:82E−02 | 9.91E−01 ± 3:76E−03 |

Figure 11:
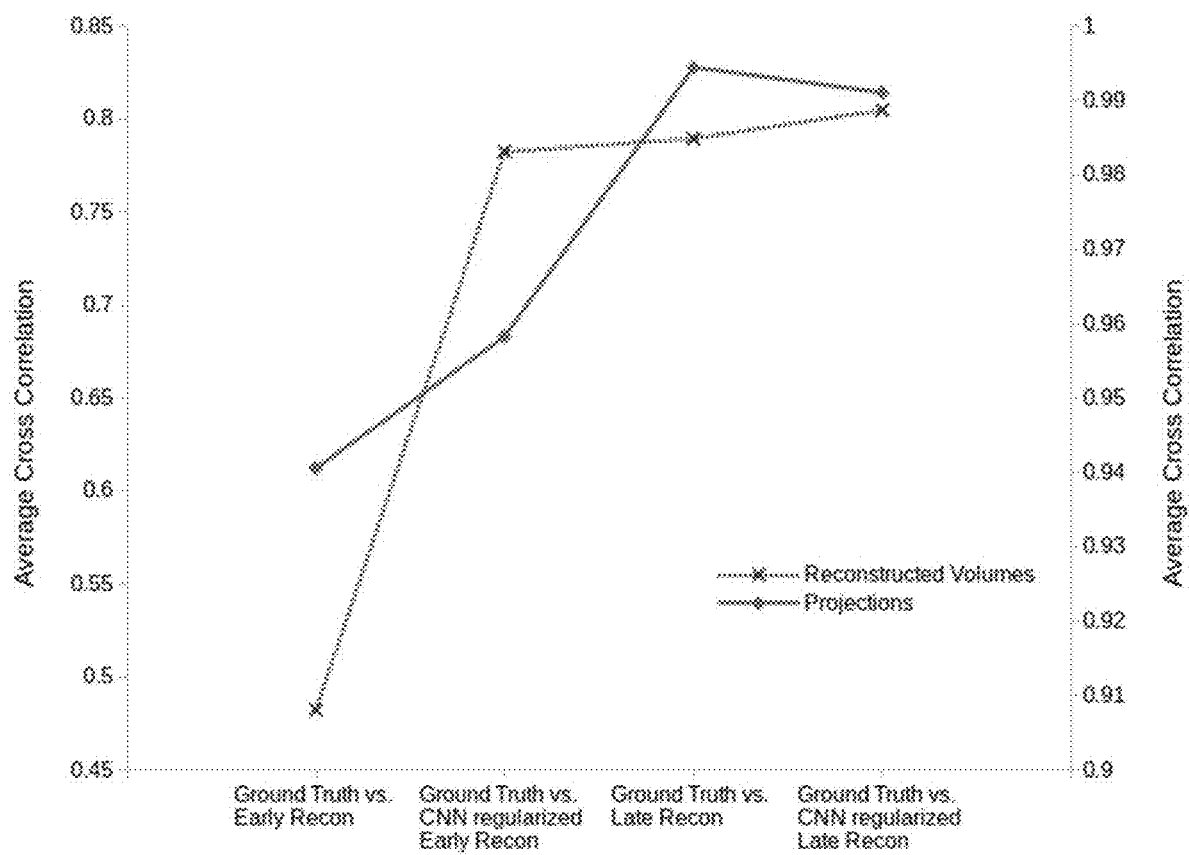
FIG. 11 is a line chart showing cross correlation with respect to ground truth associated with an example implementation of the present technology.

As the reconstruction evolves, quality of the reconstruction increases as shown by the reconstructed volume in FIG. 11. The consistency with the measured data increases from early reconstruction to CNN regularized early reconstruction to late reconstruction to CNN regularized late reconstruction, but decreases from late reconstruction to CNN regularized late reconstruction.

Although the cross-correlation between early reconstruction projections and CNN regularized early reconstructions increases on average, in medical imaging, it can be beneficial to ensure that the cross-correlation value increases for each element in the dataset. As shown in Table 2 below, 14.7% of the CNN regularized early reconstruction projections are less correlated with ground truth than early reconstruction projections which may indicate that in certain cases the CNN regularizer causes data inconsistencies with the observed data. But when the cross-correlation between late reconstruction projections and the early reconstruction projections are measured as shown in Table 3, the data consistencies can be recovered, illustrating the benefit of embedding the CNN regularizer in the tomosyntheis process to mitigate the bias introduced by the CNN regularizer.

TABLE 2

Percentage analysis of projections-size dataset: 1200

| | |
| --- | --- |
| Percentage of CNN regularized Early Recon Projections with cross correlation less than early reconstruction projections with respect to ground truth | 14.67 |
| Percentage of Late Recon Projections with cross correlation less than early reconstruction projections with respect to ground truth | 0 |

TABLE 3

Percentage analysis of volumes-size of dataset: 1200

| | |
| --- | --- |
| Percentage of CNN regularized early reconstructions with cross correlation less than early reconstructions with respect to ground truth | 0 |
| Percentage of late reconstructions with cross correlation less than early reconstructions with respect to ground truth | 0 |

Accordingly, the novel technology described herein that uses prior information from CNNs improves data tomography. The technology provides a framework that addresses the challenges of performing artifact free reconstructions when data may be insufficient. As described above, the technology has been tested in the challenging case of CBT-fluoroscopy, and quality metrics show that the technology statistically improves the image reconstruction process. The technology limits the bias introduced by the machine learning process to improve image reconstruction consistency with ground truth data (i.e., observed data).

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors, such as CPUs or GPUs, mixed environments and clusters. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media can a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or other types of non-transitory machine readable storage medium used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. An imaging system comprising:
   an imaging modality configured to generate an image dataset for a target object, wherein the image dataset contains at least one of two dimensional (2D) data or three dimensional (3D) volume data; and
   at least one memory device including instructions that, when executed by at least one processor, cause the imaging system to:
   obtain the image dataset generated by the imaging modality;
   input the image dataset to an iterative reconstruction technique that includes a machine learning model as a regularizer to reconstruct an image of the target object using the image dataset,
   wherein the machine learning model is trained, prior to generating the image dataset, to define object features and/or remove reconstruction artifacts using learning datasets that contain at least one of 2D data and 3D volume data related to the target object which is to be imaged using the imaging modality, and
   wherein the iterative reconstruction technique produces an early reconstructed image prior to applying the machine learning model and the machine learning model is included in the iterative reconstruction technique to introduce the object features into and/or remove reconstruction artifacts from the early reconstructed image of the target object to form a reconstructed image having a machine learning model bias, and then further using the image dataset as input in applying the iterative reconstruction technique to the reconstructed image to form a later reconstructed image having the machine learning model bias reduced consistent with the imaging datasets generated by the image modality.

2. The system as in claim 1, wherein the machine learning model is a convolutional neural network (CNN) or wherein the machine learning model is trained as a regression network using a Euclidean loss function.

3. The system as in claim 2, wherein the learning datasets used to train the CNN include two-dimensional (2D) slices of a reconstructed image volume and a ground truth image volume.

4. The system as in claim 2, wherein the learning datasets used to train the CNN include three-dimensional (3D) volumes of a reconstructed image volume and a ground truth image volume.

5. The system as in claim 1, wherein the iterative reconstruction technique includes a plurality of machine learning models used as regularizers at different stages of the iterative reconstruction technique.

6. The system as in claim 1, wherein the iterative reconstruction technique includes at least one non-machine learning regularizing filter used as part of reconstructing the image of the target object.

7. The system as in claim 1, wherein the imaging modality includes at least one of: a computed tomography (CT) scanner, a Cone Beam CT scanner, a tomosynthesis system, or an ultrasound imaging system.

8. The system as in claim 1, wherein the at least one memory device includes instructions that, when executed by the at least one processor, cause the imaging system to:
send the image dataset which is at least one of measured imaging data, processed measured imaging data, or reconstructed imaging data, generated or obtained using the imaging modality to at least one remote server, wherein the image dataset is included in the learning datasets and the machine learning model is trained using the learning datasets;
receive the machine learning model trained using the learning datasets that include the image dataset; and
incorporate the machine learning model in the iterative reconstruction technique.

9. The system as in claim 1, wherein the machine learning model is included at least once after all the image dataset is received.

10. The system as in claim 1, wherein the training of the machine learning model is applied only prior to input of the image dataset to the iterative reconstruction technique.

11. A computer implemented method, comprising:
receiving an image data set for a target object generated using an imaging modality, wherein the image data set contains at least one of two dimensional (2D) data or three dimensional (3D) volume data; and
inputting the image data set to an iterative reconstruction technique that includes a machine learning model as a regularization filter used in part to form a later reconstructed image of the target object using the image data set,
wherein the machine learning model is trained, prior to receiving the image data, using learning datasets containing at least one of 2D data and 3D volume data associated with the target object to be imaged using the imaging modality, the learning datasets providing objective data for training the machine learning model, and
wherein the iterative reconstruction technique produces an early reconstructed image prior to applying the machine learning model and the machine learning model is included in the iterative reconstruction technique to introduce object features into and/or remove reconstruction artifacts from the early reconstructed image of the target object to form a reconstructed image having a machine learning model bias, and then further using the image dataset as input in applying the iterative reconstruction technique to the reconstructed image to form the later reconstructed image having the machine learning model bias reduced consistent with the imaging datasets generated by the image modality.

12. The method as in claim 11, further comprising updating the machine learning model during execution of the iterative reconstruction technique using the image data generated by the imaging modality, wherein the machine learning model is trained using the image data during one or more stages of the iterative reconstruction technique.

13. The method as in claim 11, wherein training the machine learning model further comprises:
generating at least one of the early reconstructed image, the reconstructed image, and the later reconstructed image using a simulator and an image volume;
generating the later reconstructed images from the reconstructed images and ground truth images; and
training the machine learning model using the reconstructed images, wherein the reconstructed images are at least one of two-dimensional (2D) images sliced along an axial plane and 3D volume images.

14. The method as in claim 13, further comprising training the machine learning model using stochastic gradient descent.

15. The method as in claim 13, further comprising setting initial weights for the machine learning model using a Gaussian distribution with a standard deviation of $\sqrt{2/T}$ where T represents a number of incoming nodes of one neuron included in a convolutional neural network (CNN).

16. The method as in claim 13, further comprising setting initial weights for the machine learning model using weights obtained from a prior training dataset.

17. The method as in claim 15, wherein the reconstructed images provide an intermediate solution to reconstructing the image of the target object and the reconstructed images are used to adjust the weights to teach the CNN to determine ground truth provided by the ground truth images.

18. The method as in claim 16, wherein the CNN includes a Euclidean loss layer used to compute a sum of squares of differences of ground truth predictions, where Euclidean loss is given as $$E = \frac{1}{2N} \sum_{i=1}^{N} \|x_i - y_i\|_2^2$$

where $x_i$ and $y_i$ represent input and ground truth intensities, and N is a total number of pixels.

19. The method as in claim 11, wherein the learning datasets used to train the machine learning model include at least two learning datasets where a first learning dataset comprises a higher quality dataset providing ground truth data, and a second learning dataset comprises a lower quality dataset, as compared to the first learning dataset, which provides training input data for the machine learning model.

20. The method as in claim 19, wherein the higher quality dataset includes high-dose imaging scans of an object associated with the target object, and the lower quality dataset includes low-dose scans of the object associated with the target object.

21. The method as in claim 19, wherein the learning datasets include cone beam computed tomography (CT) scans of an object associated with the target object.

22. The method as in claim 19, wherein the learning datasets include tomosynthesis reconstructions of the target object to be imaged using the imaging modality.

23. The method as in claim 11, wherein the learning datasets used to train the machine learning model include at least two learning datasets where a first learning dataset comprises a lower quality dataset providing ground truth data, and a second learning dataset comprises a higher quality dataset, as compared to the first learning dataset, which provides training input data for the machine learning model.

24. A non-transitory machine readable storage medium including instructions embodied thereon, the instructions when executed by one or more processors:
- receive an image data set for a target object generated using an imaging modality, wherein the image data set contains at least one of two dimensional (2D) data or three dimensional (3D) volume data; and
- inputting the image data set to an iterative reconstruction technique that includes a convolutional neural network (CNN) as a regularizer used in part to form a later reconstructed image of the target object using the image data set,
- wherein the CNN is trained using learning datasets containing at least one of 2D data and 3D volume data associated with the target object to be imaged using the imaging modality, the learning datasets providing objective data for training the CNN, and
- wherein the iterative reconstruction technique produces an early reconstructed image prior to applying the CNN and the CNN is included in the iterative reconstruction technique to introduce object features into and/or remove reconstruction artifacts from the early reconstructed image of the target object being reconstructed to form a reconstructed image having a CNN model bias, and then further using the image dataset as input in applying the iterative reconstruction technique to the reconstructed image to form the later reconstructed image having the CNN model bias reduced consistent with the imaging datasets generated by the image modality.

25. The non-transitory machine readable storage medium in claim 24, further comprising instructions that when executed by the one or more processors cause the one or more processors to further:
- forward project a ground truth image volume to produce a two-dimensional (2D) set of projections;
- determine a difference between the image data set and the 2D set of projections;
- obtain an update volume by back projecting the difference into a three-dimensional space;
- incorporate the update volume into a reconstruction of the image of the target object; and
- apply the CNN to the reconstruction of the image as a regularization filter to produce an updated reconstruction of the image.

26. The non-transitory machine readable storage medium in claim 25, further comprising instructions that when executed by the one or more processors cause the one or more processors to further augment a learning dataset with a patient dataset associated with a patient who is to be scanned using the imaging modality.

* * * * *